US012766609B2

(12) United States Patent
Mizukoshi et al.

(10) Patent No.: US 12,766,609 B2
(45) Date of Patent: Oct. 20, 2026

(54) TOOL REST AND MACHINE TOOL

(71) Applicant: DMG MORI CO., LTD., Nara (JP)

(72) Inventors: Kenichi Mizukoshi, Nara (JP); Isao Hikita, Nara (JP)

(73) Assignee: DMG MORI CO., LTD., Nara (JP)

( * ) Notice: Subject to any disclaimer, the term of this patent is extended or adjusted under 35 U.S.C. 154(b) by 291 days.

(21) Appl. No.: 18/744,748

(22) Filed: Jun. 17, 2024

(65) Prior Publication Data

US 2024/0416426 A1 Dec. 19, 2024

(30) Foreign Application Priority Data

Jun. 19, 2023 (JP) ................................ 2023-099938
Feb. 9, 2024 (JP) ................................ 2024-018244

(51) Int. Cl.
*B23B 29/24* (2006.01)
*B23Q 3/155* (2006.01)
*B23Q 17/22* (2006.01)

(52) U.S. Cl.
CPC ............ *B23B 29/244* (2013.01); *B23B 29/24* (2013.01); *B23B 29/242* (2013.01); *B23Q 2003/15586* (2013.01)

(58) Field of Classification Search
CPC ........ B23Q 2003/15586; B23Q 17/006; B23B 29/244; B23B 29/242; B23B 29/24; B23B 2270/08; B23B 2270/09; B23B 29/20
See application file for complete search history.

(56) References Cited

U.S. PATENT DOCUMENTS 4,504,824 A * 3/1985 Mello .................. B23Q 17/003 408/6
2004/0079207 A1* 4/2004 Matsumura ........... B23B 29/242 82/158

FOREIGN PATENT DOCUMENTS

| | | |
|---|---|---|
| JP | 2006055975 A | 3/2006 |
| JP | 2019195876 A | 11/2019 |
| JP | 6970322 B2 | 11/2021 |
| JP | 2022020366 A | 2/2022 |

* cited by examiner

*Primary Examiner* — Alan Snyder
(74) *Attorney, Agent, or Firm* — IP Business Solutions, LLC.

(57) ABSTRACT

A tool rest includes a plurality of attachment portions to which a plurality of tool holders are detachably attached respectively. Each of the tool holders includes a clamp mechanism for clamping a tool. The attachment portion includes a seat surface on which the tool holder is seated. The tool rest further includes: a first air channel to which air is supplied; a plurality of second air channels branched off from the first air channel and respectively extending toward the plurality of attachment portions, each of the plurality of second air channels being open to the seat surface of a corresponding one of the plurality of attachment portions; and a detector that is provided on a path of the first air channel and detects a state of an airflow.

8 Claims, 11 Drawing Sheets

TOOL REST AND MACHINE TOOL

CROSS REFERENCE TO RELATED APPLICATIONS

This nonprovisional application is based on Japanese Patent Application No. 2023-099938 filed on Jun. 19, 2023 with the Japan Patent Office, and Japanese Patent Application No. 2024-018244 filed on Feb. 9, 2024 with the Japan Patent Office, the entire contents of which are hereby incorporated by reference.

BACKGROUND OF THE INVENTION

Field of the Invention

The present invention relates to a tool rest and a machine tool.

Description of the Background Art

For example, Japanese Patent Laying-Open No. 2022-20366 discloses a machine tool including a tool rest, a magazine, and an automatic tool changer for changing tools attached to the tool rest and the magazine.

The tool rest includes a turret turnable about a turning center axis and a plurality of tool holders that are attached to the turret side by side in the circumferential direction of the turning center axis and hold the tools. The plurality of tool holders include a first tool holder into which the tool is inserted axially of the turning center axis, and a second tool holder into which the tool is inserted radially of the turning center axis.

SUMMARY OF THE INVENTION

As disclosed in Japanese Patent Laying-Open No. 2022-20366 described above, in the turret-type tool rest, a variety of tool holders are prepared in accordance with the attitude, position, type or the like of the tool to be held. The user selects a plurality of tool holders from among the variety of tool holders in accordance with the details of machining of a workpiece, and attach these tool holders respectively to the plurality of attachment portions in the tool rest.

However, no tool holder may be attached to any attachment portion among the plurality of attachment portions due to, for example, user's carelessness. In such a case, a chip, a coolant, or the like may enter the tool rest through an opening in the attachment portion. When the tool holder is provided with a clamp mechanism that is operated by a hydraulic pressure, a hydraulic oil that should be originally supplied toward the clamp mechanism may spurt towards the surroundings of the tool rest.

Therefore, an object of the present invention is to provide a tool rest that can prevent attachment of no tool holder by virtue of a simple structure, and a machine tool including such a tool rest.

A tool rest according to the present invention includes: a base portion including a plurality of attachment portions; and a plurality of tool holders for clamping a plurality of tools, each of the plurality of tool holders including a clamp mechanism for clamping a corresponding one of the plurality of tools and detachably attached to a corresponding one of the plurality of attachment portions. Each of the plurality of attachment portions includes a seat surface on which a corresponding one of the plurality of tool holders is seated. The tool rest further includes: a first air channel to which air is supplied; a plurality of second air channels branched off from the first air channel and respectively extending toward the plurality of attachment portions, each of the plurality of second air channels being open to the seat surface of a corresponding one of the plurality of attachment portions; and a detector that is provided on a path of the first air channel and detects a state of an airflow.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
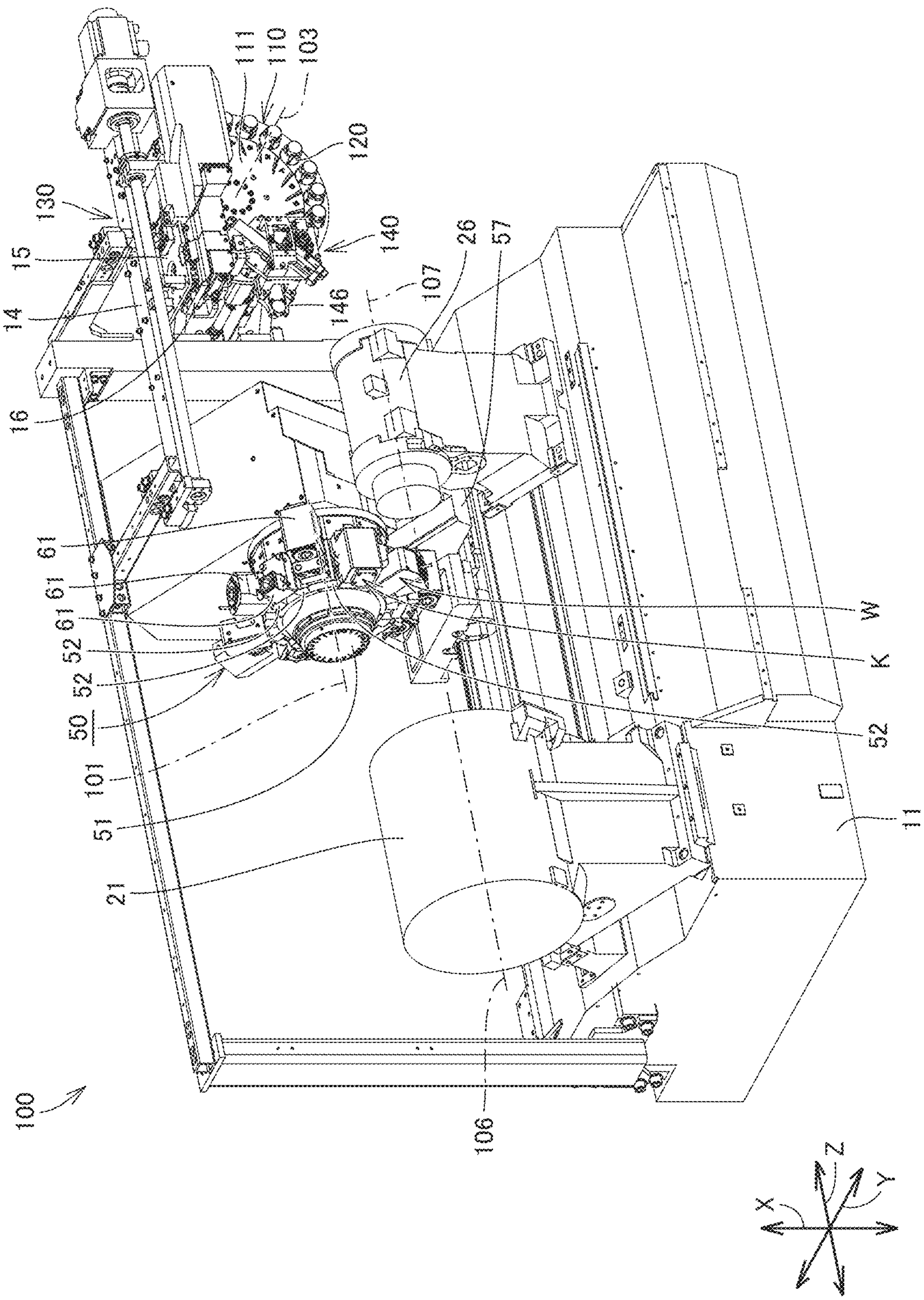
FIG. 1 is a perspective view of a machine tool including a tool rest in an embodiment of the present invention.

An embodiment of the present invention will be described with reference to the drawings. In the drawings referred to below, the same or corresponding elements have the same reference characters allotted.

Figure 2:
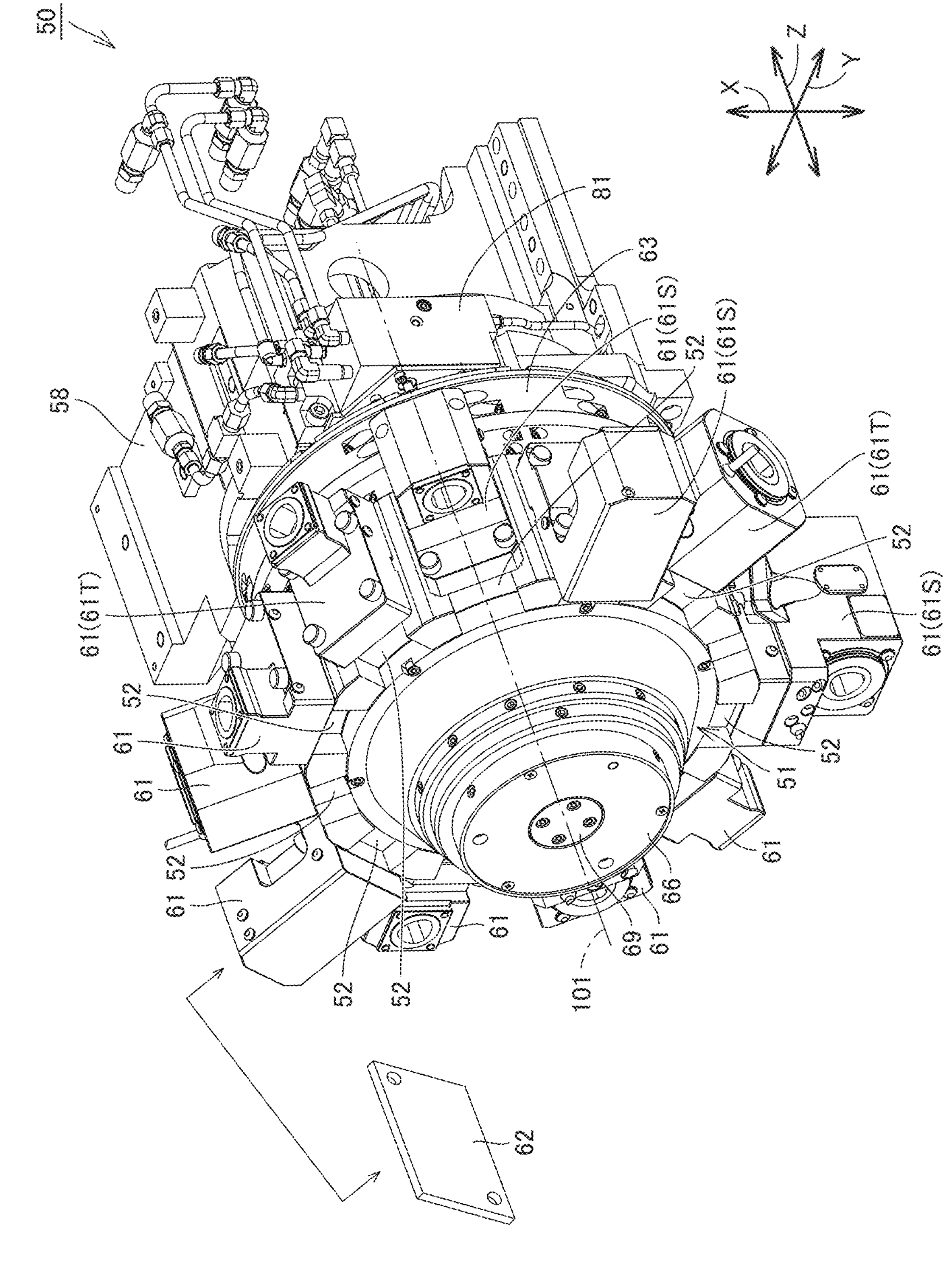
FIG. 2 is a perspective view of the tool rest in FIG. 1.

FIG. 1 is a perspective view of a machine tool including a tool rest in an embodiment of the present invention. FIG. 1 shows the internal structure of the machine tool which is seen through a cover body that forms the external appearance of the machine tool. FIG. 2 is a perspective view of the tool rest in FIG. 1.

Referring to FIGS. 1 and 2, a machine tool 100 is a lathe that machines a workpiece by bringing a tool into contact with a rotating workpiece. Machine tool 100 has a milling function that machines a workpiece by bringing a rotating tool into contact with a stationary workpiece.

Machine tool 100 is a numerically controlled (NC) machine tool in which various operations for machining a workpiece are automated through numerical control by a computer.

In this specification, an axis parallel to the left-right direction (width direction) of machine tool 100 and extending horizontally is referred to as "Z-axis", an axis parallel to the front-rear direction (depth direction) of machine tool 100 and extending horizontally is referred to as "Y-axis", and an axis extending vertically is referred to as "X-axis".

Although the X-axis, Y-axis, and Z-axis are set as described above for the sake of describing the structures of machine tool 100 and tool rest 50 included in machine tool 100, these axes do not always coincide with the X-axis, Y-axis, and Z-axis defined for the lathe.

First, the structure of machine tool 100 will be described. Machine tool 100 includes a bed 11, a first headstock 21, a second headstock 26, a tool rest 50, a magazine 110, and an automatic transportation device 130.

Bed 11 is a base member for supporting first headstock 21, second headstock 26, tool rest 50, magazine 110, automatic transportation device 130, and the like, and is placed on a floor of a factory or the like. Bed 11 is made of a metal such as cast iron. First headstock 21 and second headstock 26 are attached to bed 11. Each headstock of first headstock 21 and second headstock 26 has a workpiece spindle (not shown). A chuck that detachably holds a workpiece is provided at the tip of the workpiece spindle. The workpiece spindle of first headstock 21 is rotationally driven about a rotation center axis 106 parallel to the Z-axis. The workpiece spindle of second headstock 26 is rotationally driven about a rotation center axis 107 parallel to the Z-axis. First headstock 21 and second headstock 26 are arranged to face each other in the Z-axis direction such that rotation center axis 106 and rotation center axis 107 extend in a line.

Tool rest 50 is provided in a machining area. The machining area is a space in which the workpiece is machined and is substantially hermitically sealed by a cover body to prevent foreign matter, such as chips or cutting oil, associated with machining of the workpiece from leaking out of the machining area. Tool rest 50 is configured so as to hold a plurality of tools. Tool rest 50 is a turret-type tool rest that moves a plurality of held tools in the circumferential direction of a turning center axis 101 to index a tool used for machining. Turning center axis 101 extends in the Z-axis.

Tool rest 50 includes a base portion 51. Base portion 51 has a disk-shaped external appearance in its entirety with the axial direction of turning center axis 101 as its thickness direction. Base portion 51 is attached to a tool rest base 58.

Base portion 51 includes a turning portion 63 and a plurality of attachment portions 52. Turning portion 63 has a shape of a cylinder centered on turning center axis 101 in its entirety. Turning portion 63 can turn about turning center axis 101 upon input of rotation from a motor 64 (not shown).

Attachment portions 52 are provided to turning portion 63 side by side in the circumferential direction of turning center axis 101. Attachment portions 52 are provided integrally with turning portion 63. Attachment portions 52 are provided on the outer circumferential surface of turning portion 63. Attachment portions 52 are equidistantly provided in the circumferential direction of turning center axis 101. Attachment portions 52 are turnable about turning center axis 101 together with turning portion 63. In the present embodiment, base portion 51 includes twelve attachment portions 52.

Tool rest 50 further includes a plurality of tool holders 61. Tool holder 61 is a device for holding a tool in tool rest 50. Tool holders 61 are detachably attached to attachment portions 52 respectively. Tool holders 61 are respectively fastened to attachment portions 52 with bolts.

Tool holders 61 are provided side by side in the circumferential direction of turning center axis 101. Tool holder 61 is configured so as to hold a tool. When being classified according to the inserting direction of the tool, tool holders 61 include a first tool holder 61S, into which a tool is inserted axially of turning center axis 101, and a second tool holder 61T, into which a tool is inserted radially of turning center axis 101.

Tool holder 61 includes a clamp mechanism 79 (see FIG. 6, which will be described later), which is hydraulically operated for clamping a tool. An example of the shank specifications of tools that can be held by tool holders 61 is CAPTO. Tool holder 61 may include a built-in rotary mechanism portion that rotates a tool upon input of rotation from the base portion 51 side.

The user may decide that it is not required to attach tool holder 61 to attachment portion 52 at a specific location. In this case, a lid body 62, which is shown in FIG. 2, is attached to attachment portion 52 in place of tool holder 61.

As turning portion 63 turns about turning center axis 101, the tool held by tool holder 61 moves in the circumferential direction of turning center axis 101. Tool holder 61 is positioned at a workpiece machining position W when machining a workpiece held by the workpiece spindle of first headstock 21 or second headstock 26. When changing tools with automatic transportation device 130, which will be described later, tool holder 61 is positioned at a tool-rest-side tool change position K. Workpiece machining position W and tool-rest-side tool change position K are positioned adjacent to each other in the circumferential direction of turning center axis 101.

Tool rest base 58 is supported by bed 11 via a saddle 57 and a cross slide (not shown). Saddle 57 is movable in the Z-axis direction by various feed mechanisms, guide mechanisms, servomotors, and the like. The cross slide (not shown) is movable in the axial direction ("referred to as "Xa-axis direction") orthogonal to the Z-axis and inclined to the X-axis and the Y-axis by various feed mechanisms, guide mechanisms, servomotors, and the like. As saddle 57 and the cross slide (not shown) move in the Z-axis direction and the Xa-axis direction, respectively, the position at which a workpiece is machined by the tool held by tool holder 61 can be moved in a Z-axis-Xa-axis plane.

Magazine 110 is provided outside the machining area. Magazine 110 is provided at a position apart from tool rest 50 in the Z-axis direction. Tool rest 50 is arranged between first headstock 21 and magazine 110 in the Z-axis direction.

Magazine 110 is a device for storing a plurality of tools for sequentially supplying tools to the machining area according to the purpose of machining. Magazine 110 stores rotary tools such as drills, end mills or milling cutters, or fixing tools such as outer-diameter cutting tools, inner-diameter cutting tools, or grooving tools, which are attached to tool holders 61 in tool rest 50.

Magazine 110 includes a supporting plate 111, a plurality of tool pots 120, and a motor (not shown). Supporting plate 111 has the shape of a disk centered on turning center axis 103 parallel to the Y-axis. Tool pots 120 are attached to supporting plate 111. Tool pots 120 are arranged side by side at regular intervals along the circumferential path centered on turning center axis 103.

Supporting plate 111 is turnable about turning center axis 103 by the motor (not shown). As supporting plate 111 turns about turning center axis 103, tool pots 120 are transported in the circumferential direction of turning center axis 103. In tool change with an automatic tool changer 31, which will be described later, tool pot 120 is arranged at a magazine-side tool change position.

Automatic transportation device 130 is a device for transporting tools. Automatic transportation device 130 is supported by a support frame 14. Support frame 14 extends in the Z-axis direction above second headstock 26. Automatic transportation device 130 moves in the Z-axis direction to transport tools between tool rest 50 in the machining area and magazine 110 outside the machining area.

Automatic transportation device 130 includes a first base 15 and a second base 16. First base 15 is movable in the Z-axis direction relative to support frame 14 by various feed mechanisms, guide mechanisms, servomotors, and the like. Second base 16 is movable in the Y-axis direction relative to first base 15 by various feed mechanisms, guide mechanisms, servomotors, and the like. With such a configuration, automatic transportation device 130 is configured to be movable in each direction of the Y-axis direction and the Z-axis direction.

Automatic transportation device 130 further includes a tool change portion 140. Tool change portion 140 changes tools with tool holder 61 positioned at tool-rest-side tool change position K in tool rest 50, and changes tools with tool pot 120 positioned at the magazine-side tool change position in magazine 110.

Tool change portion 140 includes a grasping portion 146. Grasping portion 146 detachably grasps a tool. Grasping portion 146 has such a claw shape as to grasp a tool. Tool change portion 140, which includes a pair of grasping portions 146 as grasping portion 146, is of a double-arm type that can hold two tools simultaneously. Tool change portion 140 may be of a single-arm type that can hold one tool simultaneously.

Tool change portion 140 is configured to be turnable about the turning center axis extending in the X-axis direction so as to change the attitude of grasping portion 146 in conformity with the direction in which a tool is inserted into tool holder 61.

Figure 3:
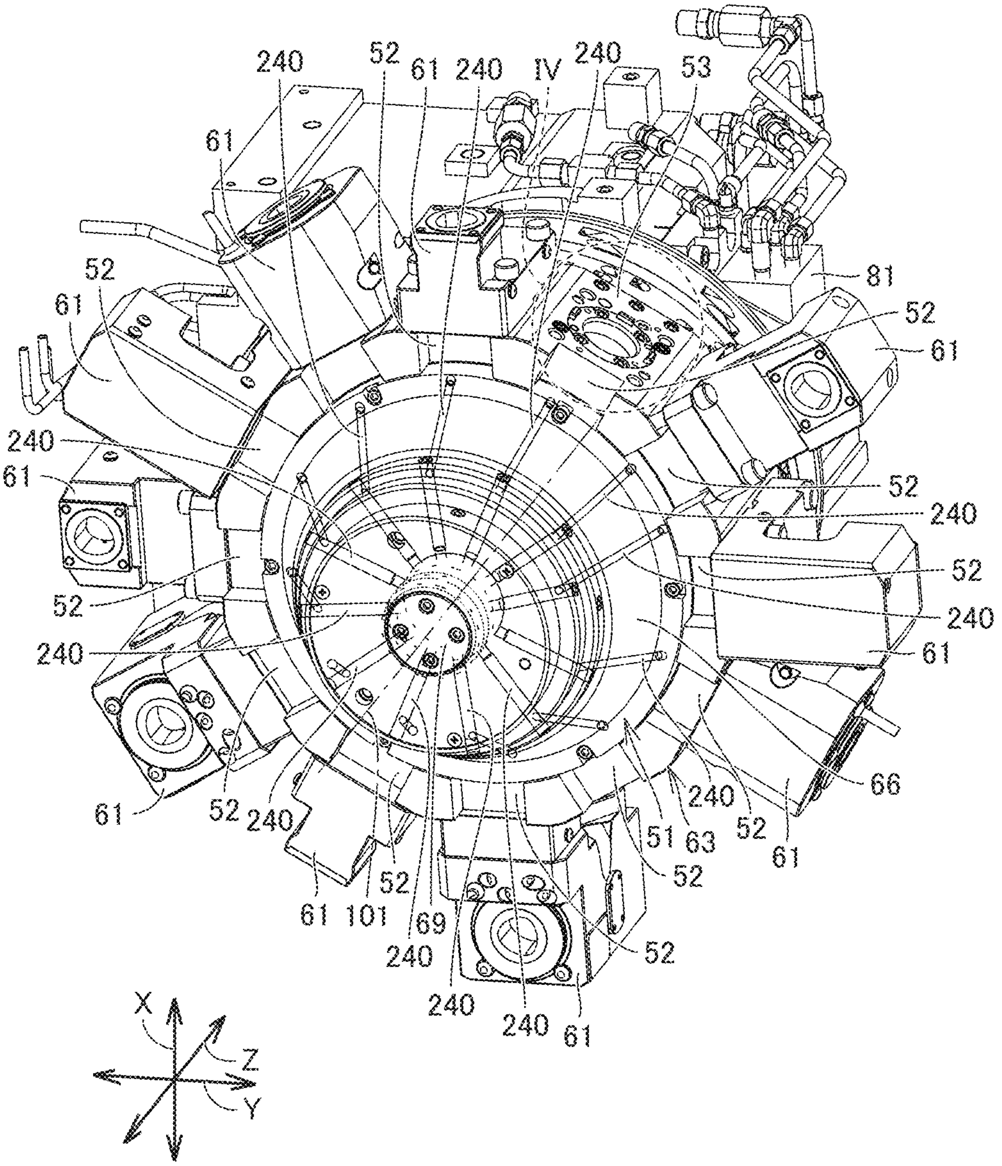
FIG. 3 is another perspective view of the tool rest in FIG. 1.
Figure 4:
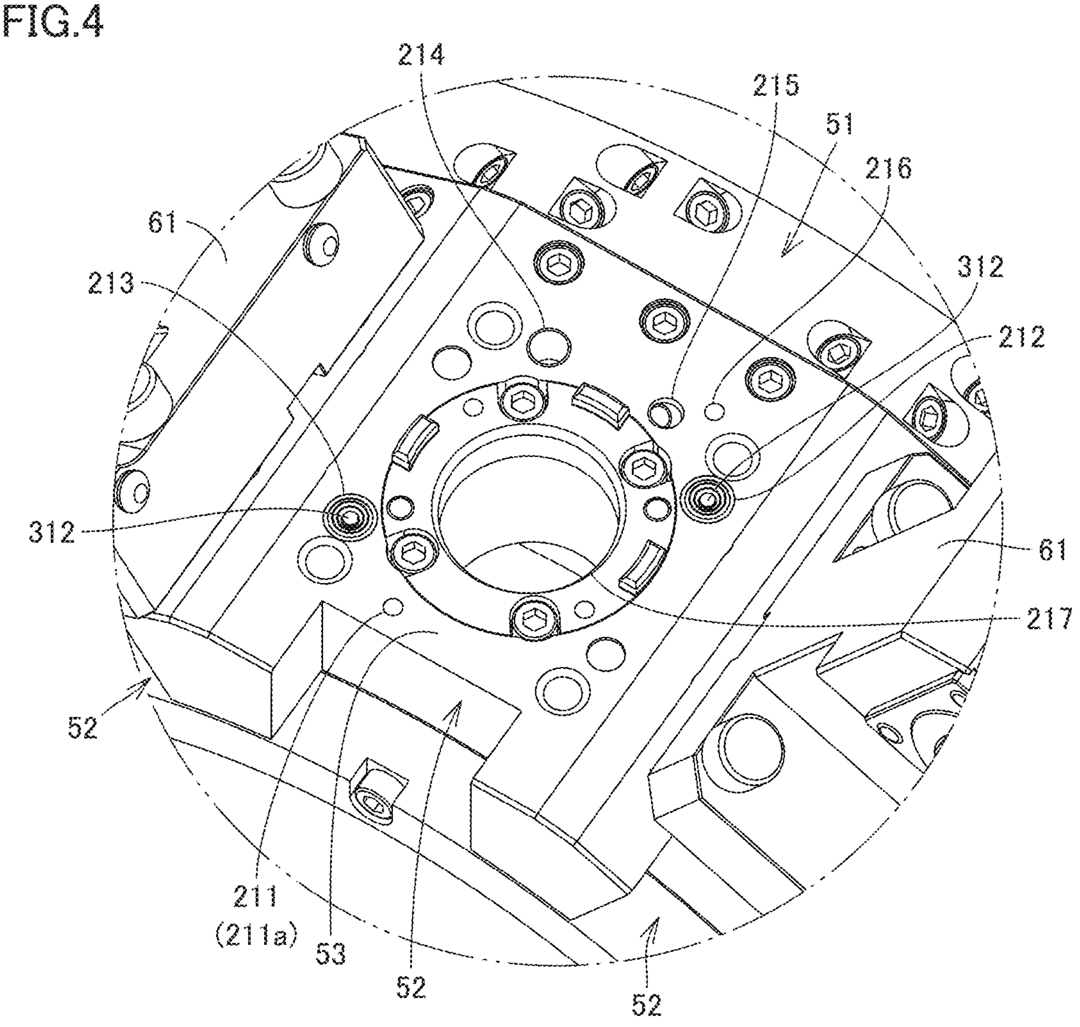
FIG. 4 is a perspective view of the tool rest (attachment portion) in a range surrounded by the chain double-dashed line IV in FIG. 3.
Figure 5:
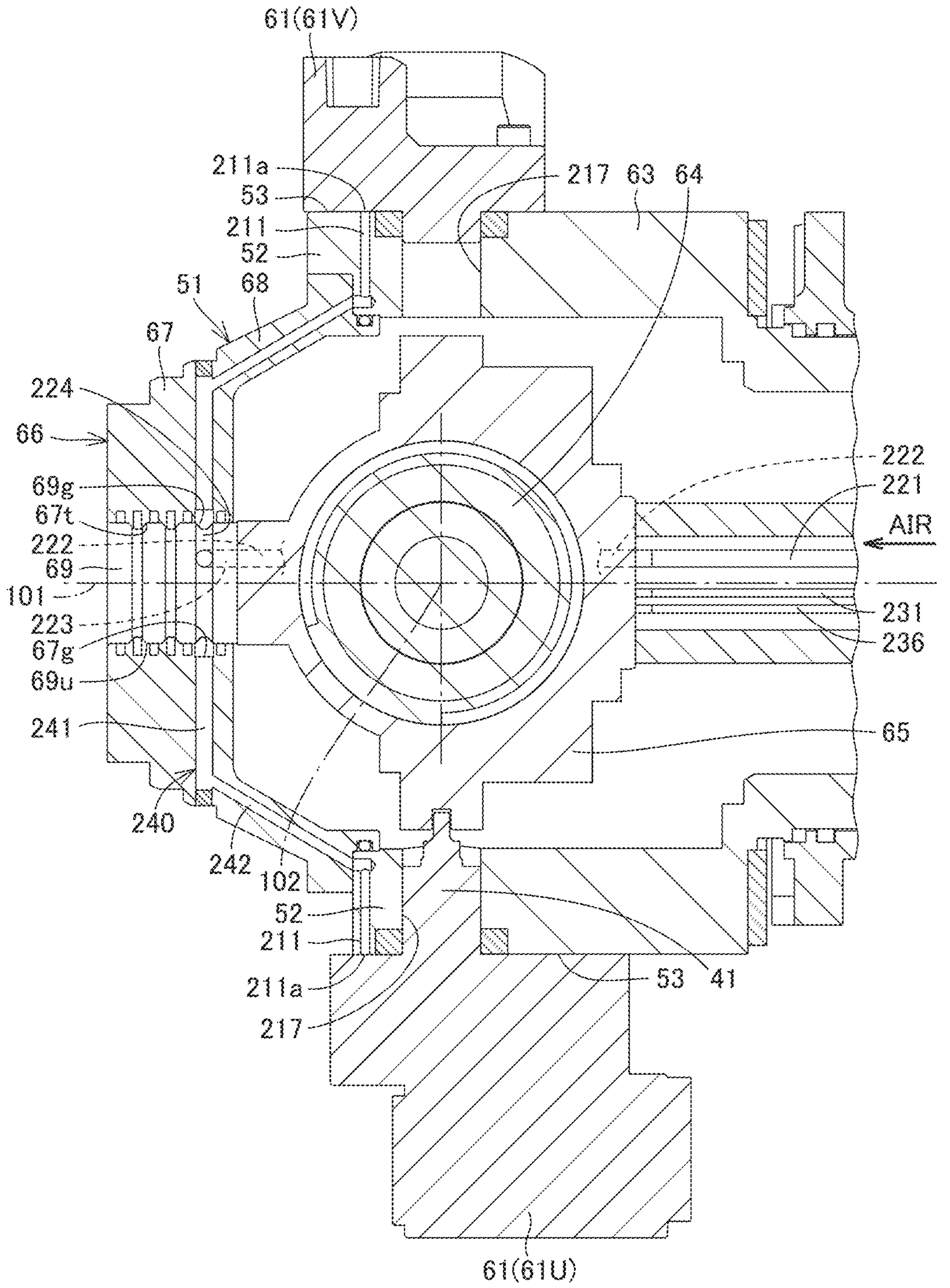
FIG. 5 is a sectional view of the tool rest in FIG. 1.

Next, a more specific structure of tool rest 50 will be described. FIG. 3 is another perspective view of the tool rest in FIG. 1. In FIG. 3, a part of the internal pipe of tool rest 50 is shown as tool rest 50 is seen through. FIG. 4 is a perspective view of the tool rest (attachment portion) in the range surrounded by the chain double-dashed line IV in FIG. 3. FIG. 5 is a sectional view of the tool rest in FIG. 1.

Referring to FIGS. 3 to 5, tool rest 50 further includes a housing 65 and a motor 64. Housing 65 is fixed inside turning portion 63. Turning portion 63 is located on the rotating side on which turning portion 63 is turnable about turning center axis 101, whereas housing 65 is located on the fixing side.

Motor 64 is a milling motor for rotating a tool held by tool holder 61. Motor 64 is arranged inside turning portion 63. Motor 64 is arranged radially inward of turning center axis 101 relative to attachment portions 52. A stator of motor 64 is fixed to housing 65. A rotor of motor 64 is supported by housing 65 so as to be rotatable about rotation center axis 102. Rotation center axis 102 of motor 64 intersects turning center axis 101 at an angle of 90°.

Tool rest 50 further includes a shaft portion 69 and a lid portion 66. Shaft portion 69 has the shape of a shaft centered on turning center axis 101. Shaft portion 69 is connected to housing 65. Shaft portion 69 is provided at a position projecting axially of turning center axis 101 from turning portion 63 (attachment portion 52).

Lid portion 66 is connected to an end of turning portion 63 in the axial direction of turning center axis 101. Lid portion 66 is connected to an end of turning portion 63 that is opened axially of turning center axis 101. Lid portion 66 is provided to face housing 65 and motor 64 axially of turning center axis 101. Lid portion 66 is turnable about turning center axis 101 together with turning portion 63.

Lid portion 66 is fitted onto the outer circumference of shaft portion 69. Lid portion 66 is provided to close an opening portion generated between shaft portion 69 and turning portion 63 radially of turning center axis 101. Lid portion 66 turns about turning center axis 101 while sliding relative to shaft portion 69.

Lid portion 66 includes a housing portion 67 and a tapered portion 68. Housing portion 67 has a cylindrical shape centered on turning center axis 101 in its entirety. Housing portion 67 is spaced from turning portion 63 axially of turning center axis 101. Turning of turning portion 63 brings an inner circumferential surface 67*t* of housing portion 67 into sliding contact with an outer circumferential surface 69*u* of shaft portion 69.

Tapered portion 68 projects from housing portion 67 axially of turning center axis 101 so as to approach turning portion 63. Tapered portion 68 has the shape of a cylinder centered on turning center axis 101. Tapered portion 68 has a tapered shape with a circumferential surface inclined to the axial direction of turning center axis 101. The diameter of tapered portion 68 centered on turning center axis 101 increases from housing portion 67 toward turning portion 63 axially of turning center axis 101. A small-diameter end of tapered portion 68 is contiguous to housing portion 67, and a large-diameter end of tapered portion 68 is connected to turning portion 63.

Attachment portion 52 has a seat surface 53. Tool holder 61 is seated on seat surface 53. Tool holder 61 attached to attachment portion 52 is in surface contact with seat surface 53. Seat surface 53 is formed of a plane. Seat surface 53 corresponds to each of the side surfaces of a prism of a regular polygon (a regular dodecagon in the present embodiment) corresponding to the number of attachment portions 52.

As shown in FIG. 4, attachment portion 52 has a first hole 211, a second hole 212, a third hole 213, a fourth hole 214, a fifth hole 215, and a sixth hole 216. First hole 211, second hole 212, third hole 213, fourth hole 214, fifth hole 215, and sixth hole 216 are open to seat surface 53. Each hole of first hole 211, second hole 212, third hole 213, fourth hole 214, fifth hole 215, and sixth hole 216 has a circular opening shape.

The air for checking seating of tool holder 61 (lid body 62) on seat surface 53 circulates through first hole 211. When tool holder 61 (lid body 62) is attached to attachment portion 52, an opening 211*a* of first hole 211 in seat surface 53 is closed by tool holder 61. This regulates an airflow in first hole 211. In contrast, when tool holder 61 (lid body 62) is not attached to attachment portion 52, opening 211*a* of first hole 211 in seat surface 53 is opened to the atmosphere. This permits an airflow in first hole 211.

A hydraulic oil for causing clamp mechanism 79 built in tool holder 61 to perform a clamping operation circulates through second hole 212. A hydraulic oil for causing clamp mechanism 79 built in tool holder 61 to perform an unclamping operation circulates through third hole 213. A valve body 312 is inserted into each hold of second hole 212 and third hole 213. Valve body 312 operates to permit an outflow of the hydraulic oil through second hole 212 and third hole 213 when tool holder 61 is attached to attachment portion 52 and regulate an outflow of the hydraulic oil through second hole 212 and third hole 213 when tool holder 61 is not attached to attachment portion 52.

Any one of a coolant and the air for tapered air blow circulates through fourth hole 214 and fifth hole 215. The coolant supplied through fourth hole 214 and fifth hole 215 to tool holder 61 flows inside a tool held by tool holder 61 and is discharged from the cutting edge of the tool. The air supplied through fourth hole 214 and fifth hole 215 to tool holder 61 is sprayed toward the tapered surface of tool holder 61 that receives the shank portion of the tool.

The air for checking clamping of the tool circulates through sixth holes 216 in tool holders 61 positioned at tool-rest-side tool change position K and workpiece machining position W in FIG. 1. The air supplied through sixth hole 216 to tool holder 61 is discharged from an opening that is open to a holder end surface of tool holder 61. During clamping of the tool in tool holder 61, the opening is closed by the end surface of the shank portion of the tool.

Attachment portion 52 further has a seventh hole 217. Seventh hole 217 is open to seat surface 53. Seventh hole 217 has a circular opening shape. The opening area of seventh hole 217 is larger than the opening area of each hole of first hole 211, second hole 212, third hole 213, fourth hole 214, fifth hole 215, and sixth hole 216. First hole 211, second hole 212, third hole 213, fourth hole 214, fifth hole 215, and sixth hole 216 are open, around seventh hole 217, side by side in the circumferential direction of seventh hole 217.

As shown in FIG. 5, when being classified according to whether or not the tool can rotate, tool holders 61 include a third tool holder 61U, which can hold a rotary tool, and a fourth tool holder 61V, which can hold a fixing tool. Third tool holder 61U includes a clutch shaft 41. Clutch shaft 41 is inserted into seventh hole 217. When third tool holder 61U is positioned at workpiece machining position W in FIG. 1, the tip of clutch shaft 41 is coupled to the rotor shaft of motor 64.

Next, the mechanism for checking seating of tool holder 61 on seat surface 53 will be described in more detail.

As shown in FIGS. 3 and 5, lid portion 66 has a plurality of first radial holes 240 (corresponding to "a plurality of holes" in the present invention). First radial holes 240 extend in a radial manner around turning center axis 101. As lid portion 66 is viewed axially of turning center axis 101, first radial holes 240 extend radially of turning center axis 101 while being spaced from each other in the circumferential direction of turning center axis 101.

First radial holes 240 include a first section 241 and a second section 242. First section 241 is located upstream of an airflow in first radial holes 240, and second section 242 is located downstream of the airflow in first radial holes 240. First section 241 is provided in housing portion 67. Second section 242 is provided across housing portion 67 and tapered portion 68.

First section 241 extends from inner circumferential surface 67*t* of housing portion 67 radially outward of turning center axis 101. Second section 242 extends radially outward of turning center axis 101 while approaching turning portion 63 from housing portion 67 axially of turning center axis 101. The end of second section 242 upstream of the airflow is in communication with first section 241, and the end of second section 242 downstream of the airflow is in communication with first hole 211 in attachment portion 52.

A first annular groove 224 (corresponding to an "annular groove" in the present invention) is provided between shaft portion 69 and lid portion 66 radially of turning center axis 101. First annular groove 224 extends in the circumferential direction of turning center axis 101. First annular groove 224 is connected with first radial holes 240 (first section 241).

Lid portion 66 and shaft portion 69 have a recess 67*g* and a recess 69*g*, respectively. Recess 67*g* is recessed from inner circumferential surface 67*t* of housing portion 67 and extends in the circumferential direction of turning center axis 101. Recess 69*g* is recessed from outer circumferential surface 69*u* of shaft portion 69 and extends in the circumferential direction of turning center axis 101 while facing recess 67*g* radially of turning center axis 101. First annular groove 224 is defined by recess 67*g* and recess 69*g*.

With such a configuration, a rotary joint is configured that maintains a state in which first annular groove 224 is in communication with first radial holes 240 during turning of lid portion 66 about turning center axis 101.

Housing 65 is connected with first pipe 221. First pipe 221 is connected to housing 65 from the side opposite to shaft portion 69 axially of turning center axis 101. Housing 65 has a hole 222, which is in communication with first pipe 221. Shaft portion 69 has a hole 223, which extends between hole 222 and first annular groove 224. Air is supplied to first pipe 221 from an air compressor (not shown). The air flows through hole 222, hole 223, first annular groove 224, and first radial holes 240 in the stated order to be supplied to first hole 211 in attachment portion 52.

Figure 6:
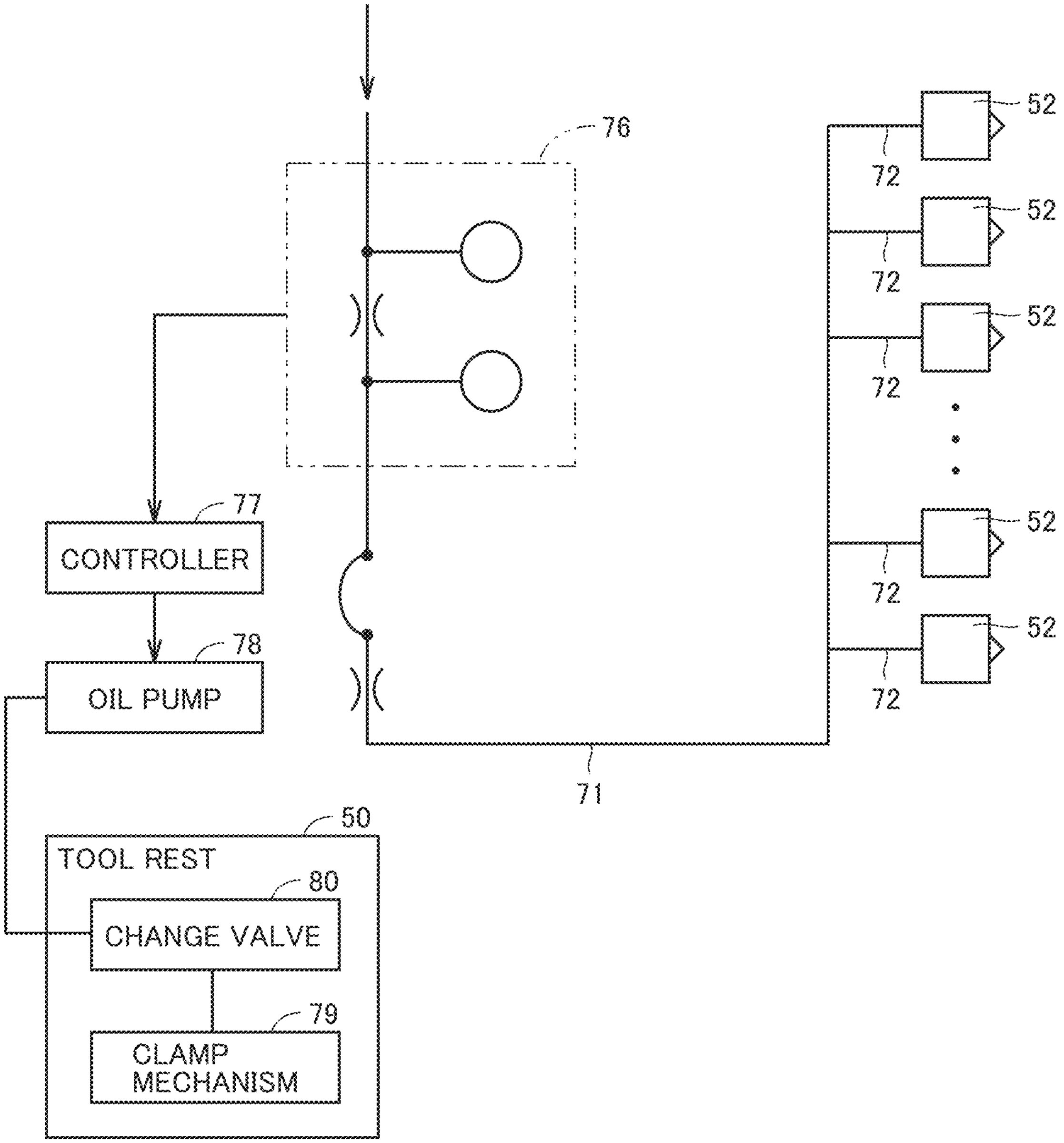
FIG. 6 is a circuit diagram showing a mechanism for checking seating of a tool holder in the tool rest in FIG. 1.

FIG. 6 is a circuit diagram showing a mechanism for checking seating of a tool holder in the tool rest in FIG. 1. Referring to FIG. 6, tool rest 50 has a first air channel 71 and a plurality of second air channels 72. Air is supplied to first air channel 71. Second air channels 72 are branched off from first air channel 71. Second air channels 72 respectively extend toward attachment portions 52. Second air channel 72 is open to seat surface 53.

First air channel 71 is formed by first pipe 221, hole 222, hole 223, and first annular groove 224 in FIG. 5. Second air channel 72 is formed by first radial hole 240 and first hole 211 in FIG. 5.

Turning portion 63, in which motor 64 for rotating the tool is built, is highly restricted on space. In the present embodiment, as first radial hole 240 is provided in lid portion 66 connected to the end of turning portion 63 in the axial direction of turning center axis 101, second air channel 72 for supplying the air to each attachment portion 52 can be formed while avoiding the restriction on space. As first annular groove 224 is provided in shaft portion 69 that has the shape of a shat centered on turning center axis 101 and is fitted with lid portion 66 on its outer circumference, first air channel 71 can be formed that maintains communication with second air channels 72 irrespective of turning of lid portion 66.

An example way of checking seating of tool holder 61 on seat surface 53 is a way of providing a switch pressed down by tool holder 61 to each attachment portion 52. In this case, between shaft portion 69 and lid portion 66 radially of turning center axis 101, a rotary joint that maintains an electrical contact during turning of lid portion 66 is provided, and also, electrical wiring is laid in a path similar to first air channel 71 and second air channels 72. Contrastingly, in the present embodiment, an air pipe is used as the mechanism for checking seating of tool holder 61 on seat surface 53, and accordingly, such a mechanism can be constructed easily and inexpensively.

Tool rest 50 further includes a detector 76. Detector 76 is provided on a path of first air channel 71. Detector 76 is connected to, for example, first pipe 221. Detector 76 can detect the state of an airflow in first air channel 71. Detector 76 is a differential pressure sensor that can detect the difference between the pressure of the air upstream (on the primary side) of the airflow in first air channel 71 relative to detector 76 and the pressure of the air downstream (on the secondary side) of the airflow in first air channel 71 relative to detector 76.

When tool holder 61 is attached to all of attachment portions 52, the opening of second air channel 72 (opening 211*a* of first hole 211) in seat surface 53 is closed by tool holder 61. In this case, a differential pressure of a predetermined threshold or more is detected by detector 76 between the primary side and the secondary side in first air channel 71. Contrastingly, when tool holder 61 is not attached to at least any one attachment portion 52 of attachment portions 52, the air flows out through the opening of second air channel 72 (opening 211*a* of first hole 211) in seat surface 53 in this attachment portion 52. In this case, a differential pressure of the predetermined threshold or more is not detected by detector 76 between the primary side and the secondary side in first air channel 71.

Detector 76 is not limited to a differential pressure sensor and may be, for example, a flow rate sensor that can detect a flow rate of the air in first air channel 71.

Machine tool 100 further includes a controller 77. Detector 76 outputs, to controller 77, the detected state of the airflow (the differential pressure between the primary side and the secondary side) in first air channel 71.

Controller 77 determines whether there is any attachment portion 52 without tool holder 61 attached thereto among attachment portions 52, based on the state of the airflow which is detected by detector 76. In other words, controller 77 determines that tool holder 61 is attached to all of attachment portions 52 when a differential pressure of the predetermined threshold or more is detected by detector 76 between the primary side and the secondary side in first air channel 71. When the differential pressure of the predetermined threshold or more is not detected between the primary side and the secondary side in first air channel 71, controller 77 determines that there is any attachment portion 52 without tool holder 61 attached thereto among attachment portions 52.

When determining that there is any attachment portion 52 without tool holder 61 attached thereto among attachment portions 52, controller 77 regulates an operation of clamp mechanism 79. More specifically, even when instructed to perform automatic tool changing (ATC) based on the description of the NC program, controller 77 does not operate an oil pump 78 for supplying the hydraulic oil to clamp mechanism 79. Controller 77 may perform control to stop the execution of the NC program when determining that there is an attachment portion 52 without tool holder 61 attached thereto among attachment portions 52.

In the present embodiment, detector 76 is provided on the path of first air channel 71. With such a configuration, attaching of no tool holder 61 to attachment portion 52 can be detected with a simple configuration compared with the case where detector 76 is provided on each of a path of second air channels 72.

Upon detection of attaching of no tool holder 61 to attachment portion 52, the hydraulic oil for clamp mechanism 79 can be prevented from spurting out of second hole 212 and third hole 213 that are open to seat surface 53. In addition, intrusion of chips, a coolant, or the like into tool rest 50 through seventh hole 127 or the like that is open to seat surface 53 can be prevented.

Next, a pipe structure for supplying various fluids to tool holder 61 will be described. Each of FIGS. 7 and 8 is another sectional view of the tool rest in FIG. 1.

Figure 7:
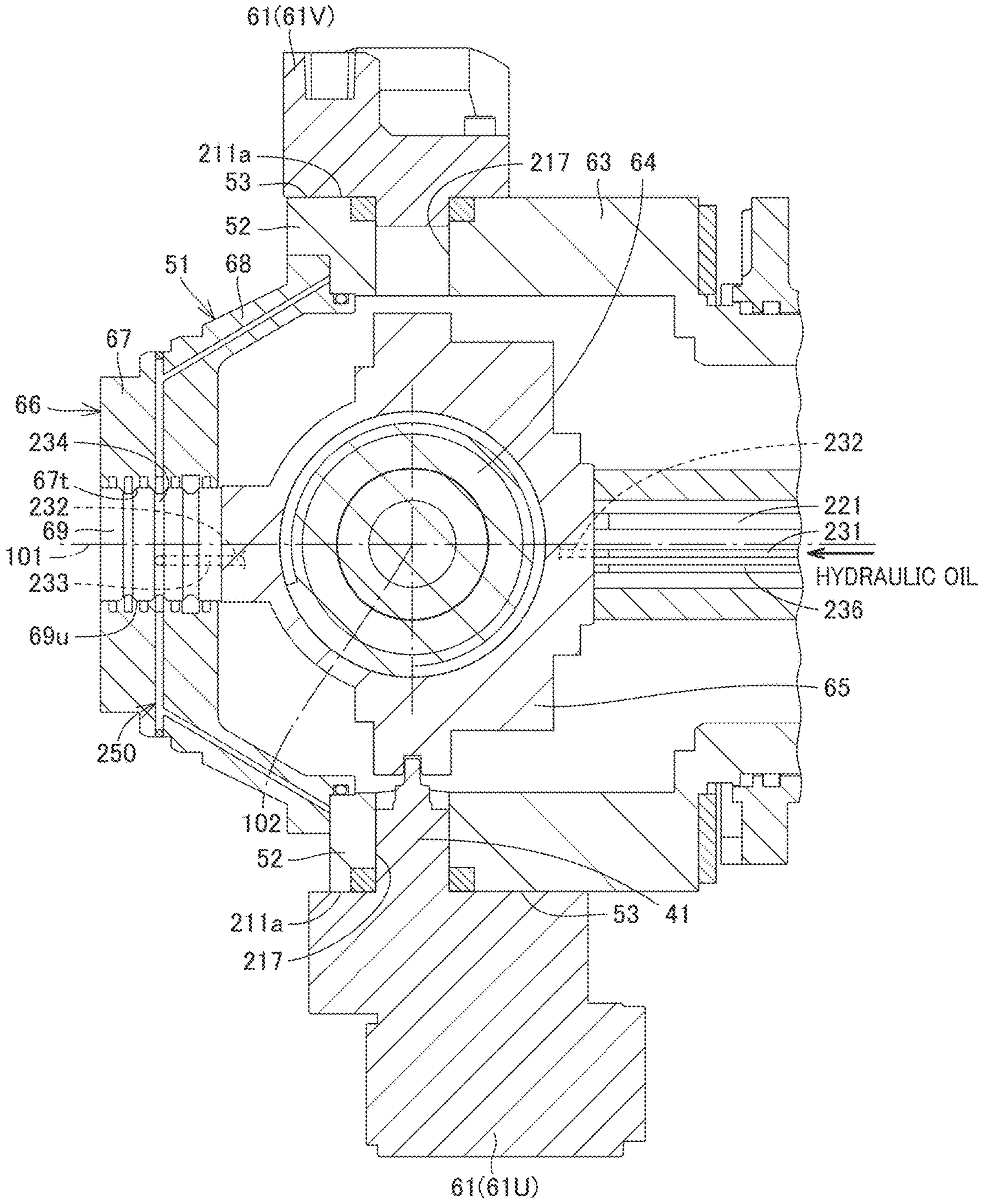
FIG. 7 is another sectional view of the tool rest in FIG. 1.
Figure 8:
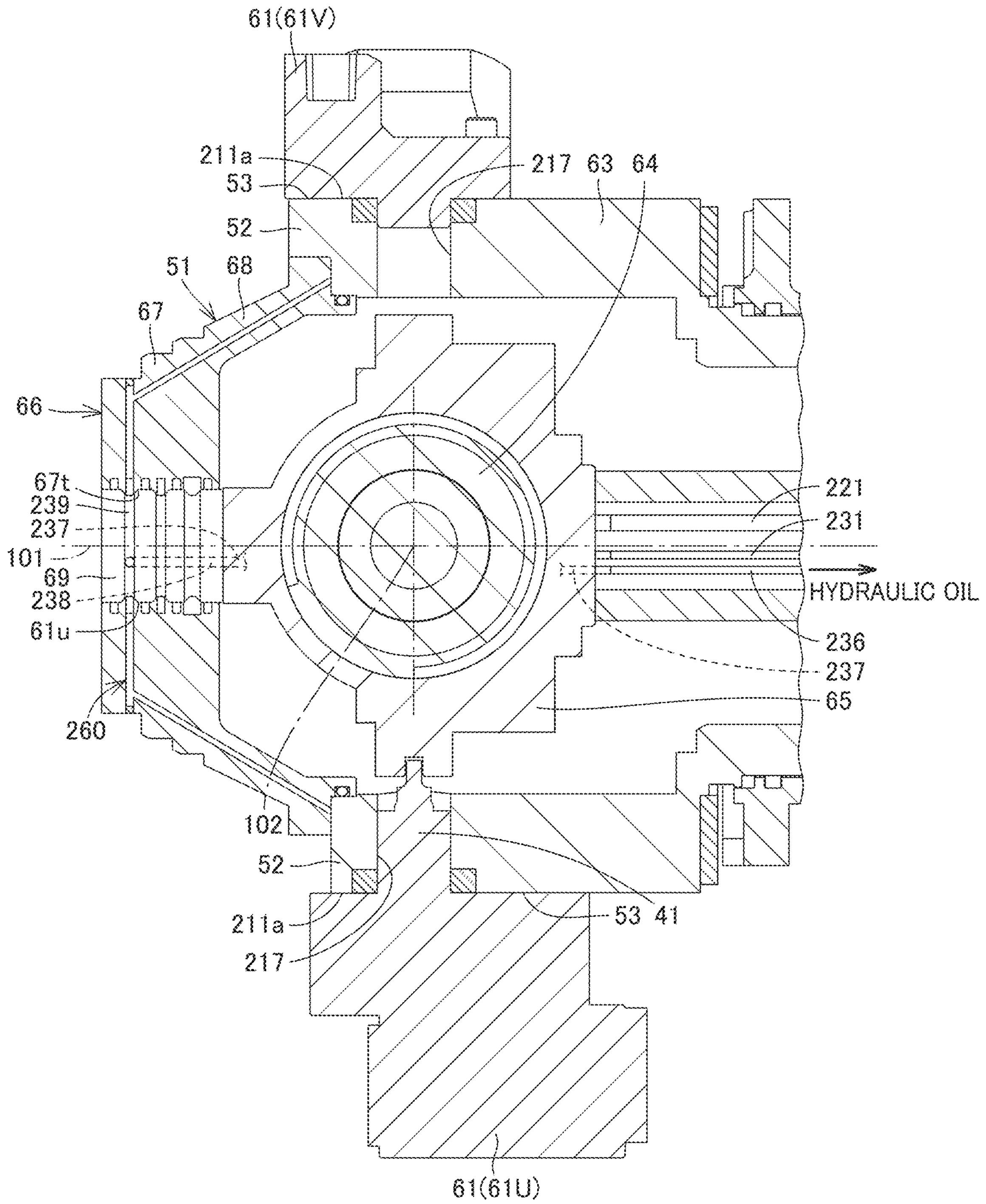
FIG. 8 is still another sectional view of the tool rest in FIG. 1.

Referring to FIG. 7, lid portion 66 further has a plurality of second radial holes 250. Second radial holes 250 are provided similarly to first radial holes 240. Second radial holes 250 are provided at angular positions displaced from first radial holes 240 in the circumferential direction of turning center axis 101.

A second annular groove 234 is further provided between shaft portion 69 and lid portion 66 radially of turning center axis 101. Second annular groove 234 is provided similarly to first annular groove 224. Second annular groove 234 is provided at a position displaced from first annular groove 224 axially of turning center axis 101. Second annular groove 234 is connected with second radial holes 250. Second annular groove 234 forms a rotary joint together with second radial holes 250.

Housing 65 is connected with a second pipe 231. Second pipe 231 is connected to housing 65 from the side opposite to shaft portion 69 axially of turning center axis 101. Housing 65 has a hole 232, which is in communication with second pipe 231. Shaft portion 69 has a hole 233, which extends between hole 232 and second annular groove 234. A hydraulic oil is supplied to second pipe 231 from oil pump 78 in FIG. 6. The hydraulic oil flows through hole 232, hole 233, second annular groove 234, and second radial holes 250 in the stated order to be supplied to an internal pipe (not shown) of turning portion 63.

Turning portion 63 includes a built-in switch valve 80 (see FIG. 6). The internal pipe of turning portion 63 causes second radial holes 250 to communicate with second hole 212 and third hole 213 in FIG. 4 through switch valve 80. Switch valve 80 switches a channel for the hydraulic oil such that the hydraulic oil is supplied to second hole 212 in FIG. 4 during clamping of a tool and the hydraulic oil is supplied to third hole 213 in FIG. 4 during unclamping of a tool.

Referring to FIG. 8, lid portion 66 further has a plurality of third radial holes 260. Third radial holes 260 are provided similarly to first radial holes 240. Third radial holes 260 are provided at angular positions displaced from first radial holes 240 and second radial holes 250 in the circumferential direction of turning center axis 101.

A third annular groove 239 is further provided between shaft portion 69 and lid portion 66 radially of turning center axis 101. Third annular groove 239 is provided similarly to first annular groove 224. Third annular groove 239 is positioned at a position displaced from first annular groove 224 and second annular groove 234 axially of turning center axis 101. Third annular groove 239 is connected with third radial holes 260. Third annular groove 239 forms a rotary joint together with third radial holes 260.

Housing 65 is connected with a third pipe 236. Third pipe 236 is connected to housing 65 from the side opposite to shaft portion 69 axially of turning center axis 101. Housing 65 has a hole 237, which is in communication with third pipe 236. Shaft portion 69 has a hole 238, which extends between hole 237 and third annular groove 239.

Upon clamping or unclamping by clamp mechanism 79, the hydraulic oil is discharged from clamp mechanism 79. The hydraulic oil is guided to third radial holes 260 through the internal pipe of turning portion 63. The hydraulic oil flows through third radial holes 260, third annular groove 239, hole 238, hole 237, and third pipe 236 in the stated order to be collected in an oil tank (not shown).

Figure 9:
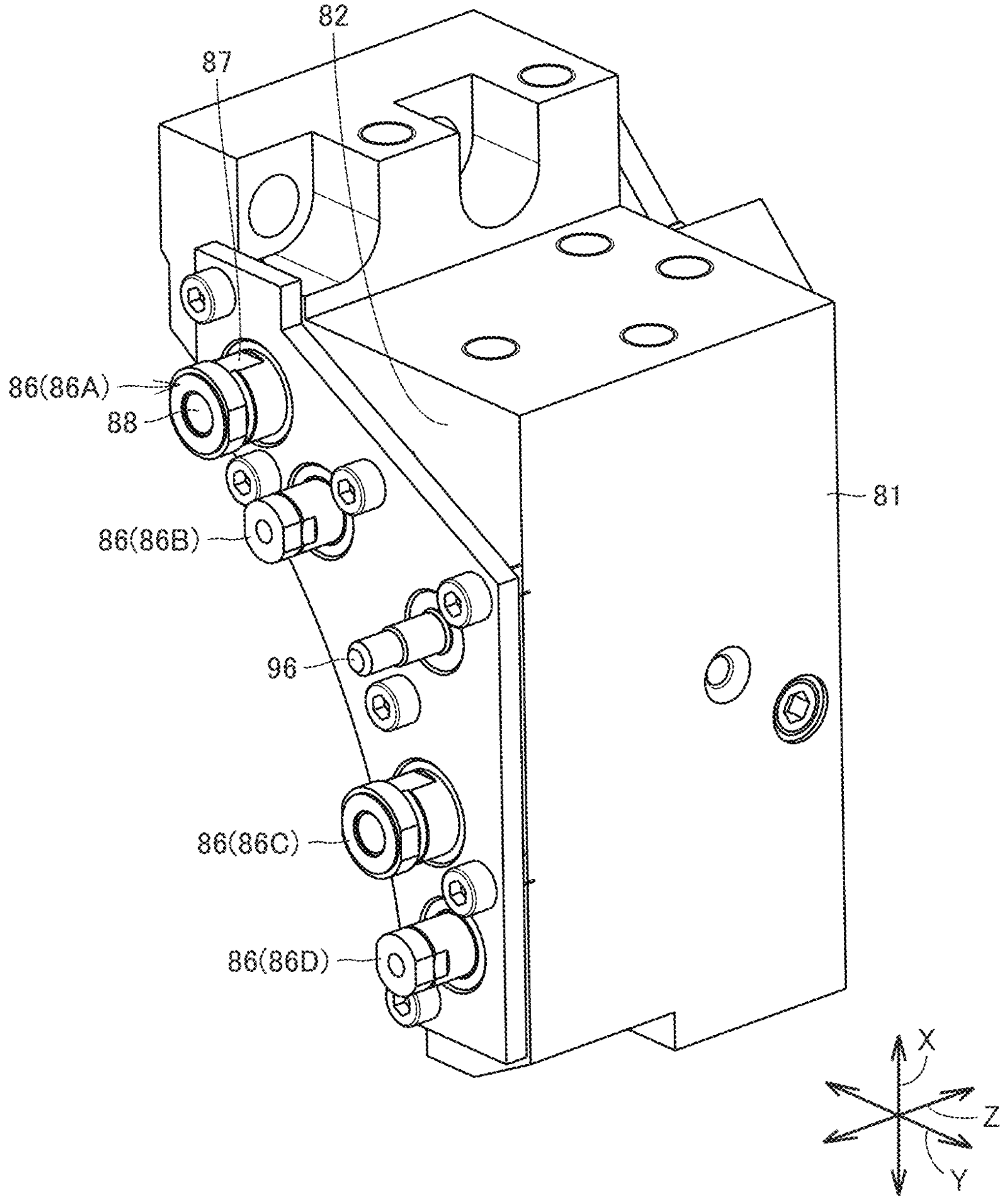
FIG. 9 is a perspective view of a piping block in FIG. 2.
Figure 10:
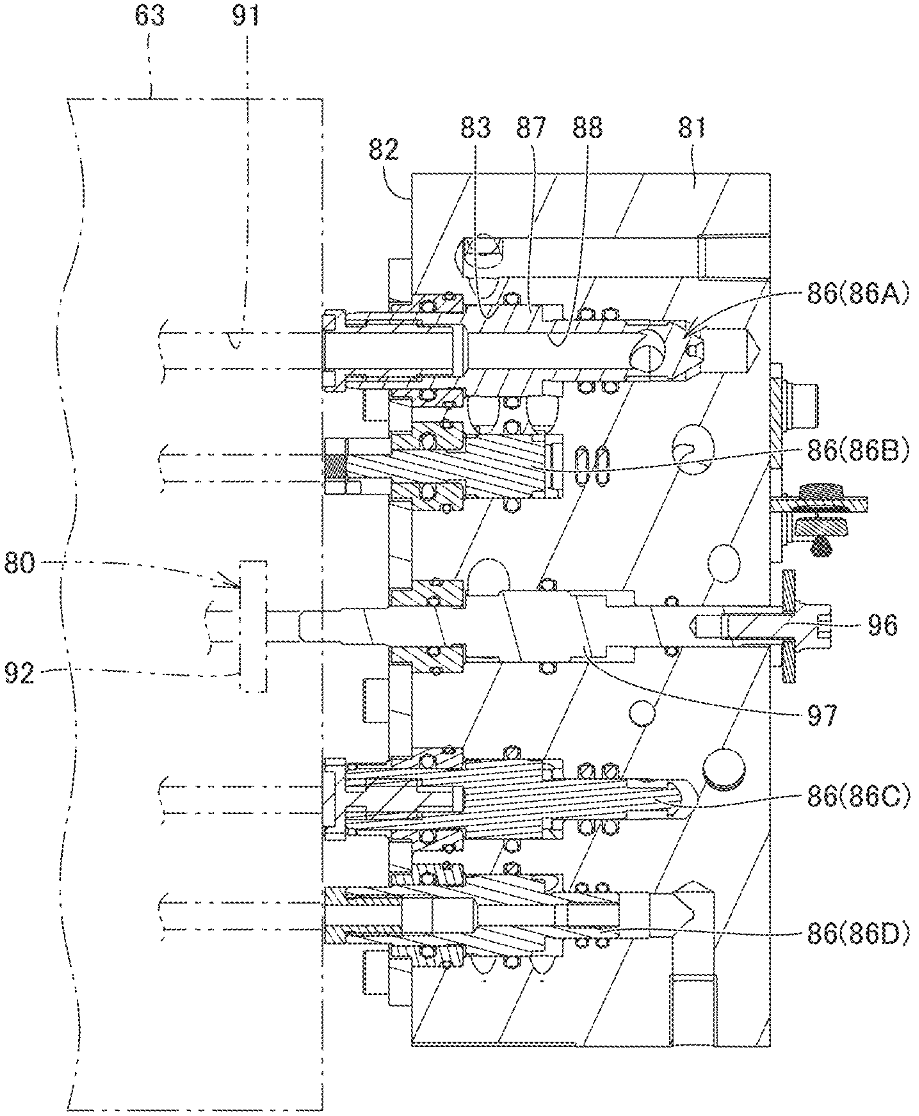
FIG. 10 is a sectional view showing an internal structure of the piping block in FIG. 2.

FIG. 9 is a perspective view of a piping block in FIG. 2. FIG. 10 is a sectional view showing the internal structure of the piping block in FIG. 2.

Referring to FIGS. 2, 9, and 10, tool rest 50 further includes a piping block 81 and a plurality of piston mechanisms 86 (86A, 86B, 86C, 86D).

Piping block 81 is provided at a position that is apart from turning center axis 101 radially outward of turning center axis 101 and that is a predetermined angular position in the circumferential direction of turning center axis 101. Piping block 81 is provided, axially of turning center axis 101, opposite to lid portion 66 with turning portion 63 in between. Piping block 81 faces turning portion 63, axially of turning center axis 101, with a gap in between.

Piping block 81 is attached to tool rest base 58. Turning portion 63 is located on the rotating side on which turning portion 63 is turnable about turning center axis 101, whereas piping block 81 is located on the fixing side.

Piston mechanism 86 is built in piping block 81. Piston mechanism 86 is provided so as to advance and retreat axially of turning center axis 101 to be distant from turning portion 63 during turning of turning portion 63 and be connected to turning portion 63 during stop of turning portion 63 (while turning is stopped).

More specifically, piping block 81 has a facing surface 82. Facing surface 82 is formed of a plane orthogonal to turning center axis 101 and faces turning portion 63, axially of turning center axis 101, with a gap in between. Piping block 81 has a piston insertion hole 83. Piston insertion hole 83 extends axially of turning center axis 101 and is open to facing surface 82.

Piston mechanism 86 includes a piston 87. Piston 87 is inserted into piston insertion hole 83. Piston 87 projects from facing surface 82. Piston 87 slides axially of turning center axis 101 by a fluid pressure such as air pressure or oil pressure. Piston 87 has a channel 88. Various fluids are supplied to channel 88 through the internal pipe of piping block 81. Channel 88 is open to the tip of piston 87, axially of turning center axis 101, on the side on which channel 88 faces turning portion 63.

During turning of turning portion 63 about turning center axis 101, piston mechanism 86 performs a contraction operation so as to reduce a length by which piston 87 projects from facing surface 82. As piston 87 becomes distant from turning portion 63, interference between turning portion 63 that is turning and piston 87 can be avoided. As turning of turning portion 63 stops, piston mechanism 86 performs an extension operation so as to increase the length by which piston 87 projects from facing surface 82. As piston 87 is connected to turning portion 63, channel 88 communicates with an internal pipe 91 of turning portion 63.

Piston mechanism 86A supplies the air for tapered air blow toward turning portion 63. Piston mechanism 86B supplies, toward turning portion 63, the air for checking clamping of a tool in tool holder 61 positioned at tool-rest-side tool change position K in FIG. 1. Piston mechanism 86C supplies a coolant toward turning portion 63. Piston mechanism 86D supplies, toward turning portion 63, the air for checking clamping of a tool in tool holder 61 positioned at workpiece machining position W in FIG. 1.

Tool rest 50 further includes a piston mechanism 96. Piston mechanism 96 includes a piston 97. Piston mechanism 96 has a similar structure to that of piston mechanism 86 except for that piston 97 does not have channel 88. Piston mechanism 96 extends to press a switch 92 for causing switch valve 80 to perform a switch operation. Upon switch 92 being pressed, switch valve 80 switches the channel for the hydraulic oil for clamping a tool which flows toward second hole 212 in FIG. 4 to the channel for the hydraulic oil for unclamping a tool which flows toward third hole 213 in FIG. 4.

As described above, in the present embodiment, various fluids are supplied to tool holder 61 using two types of fluid paths, that is, a fluid path extending in a radial manner from the axial center of turning center axis 101 radially of turning center axis 101, and a fluid path provided at a specific angular position in the circumferential direction of turning center axis 101 and extending axially of turning center axis 101. In particular, the air for checking seating of tool holder 61 (lid body 62) on seat surface 53 needs to be supplied continuously to all of tool holders 61, and thus, a fluid path at a previous stage, which allows such continuous supply of a fluid, is used.

Such a configuration can supply a variety of fluids to tool holder 61 in accordance with use of a fluid used in tool holder 61 while avoiding a limitation on space in tool rest 50.

As shown in FIGS. 1 to 3, tool holder 61 is formed of a block body. Tool holder 61 is made of metal. Tool holder 61 has a bottom surface that is in surface contact with seat surface 53 and is formed of a flat surface. Tool holder 61 has a tool insertion hole into which the shank portion of the tool is inserted. First tool holder 61S has a tool insertion hole extending axially of turning center axis 101. Second tool holder 61T has a tool insertion hole extending radially of turning center axis 101.

As a typical example, clamp mechanism 79 is composed of a drawbar slidable axially of, and about, the center axis extending axially or radially of turning center axis 101, and a plurality of collets that deform to have a larger diameter or a smaller diameter centered on the center axis of the drawbar as the drawbar slides. Along with clamping of clamp mechanism 79, the tool is held by tool holder 61 as the collet grasps the shank portion of the tool inserted into the tool insertion hole. The tool includes a shank portion grasped by clamp mechanism 79 and a cutting edge portion attached to the shank portion.

Figure 11:
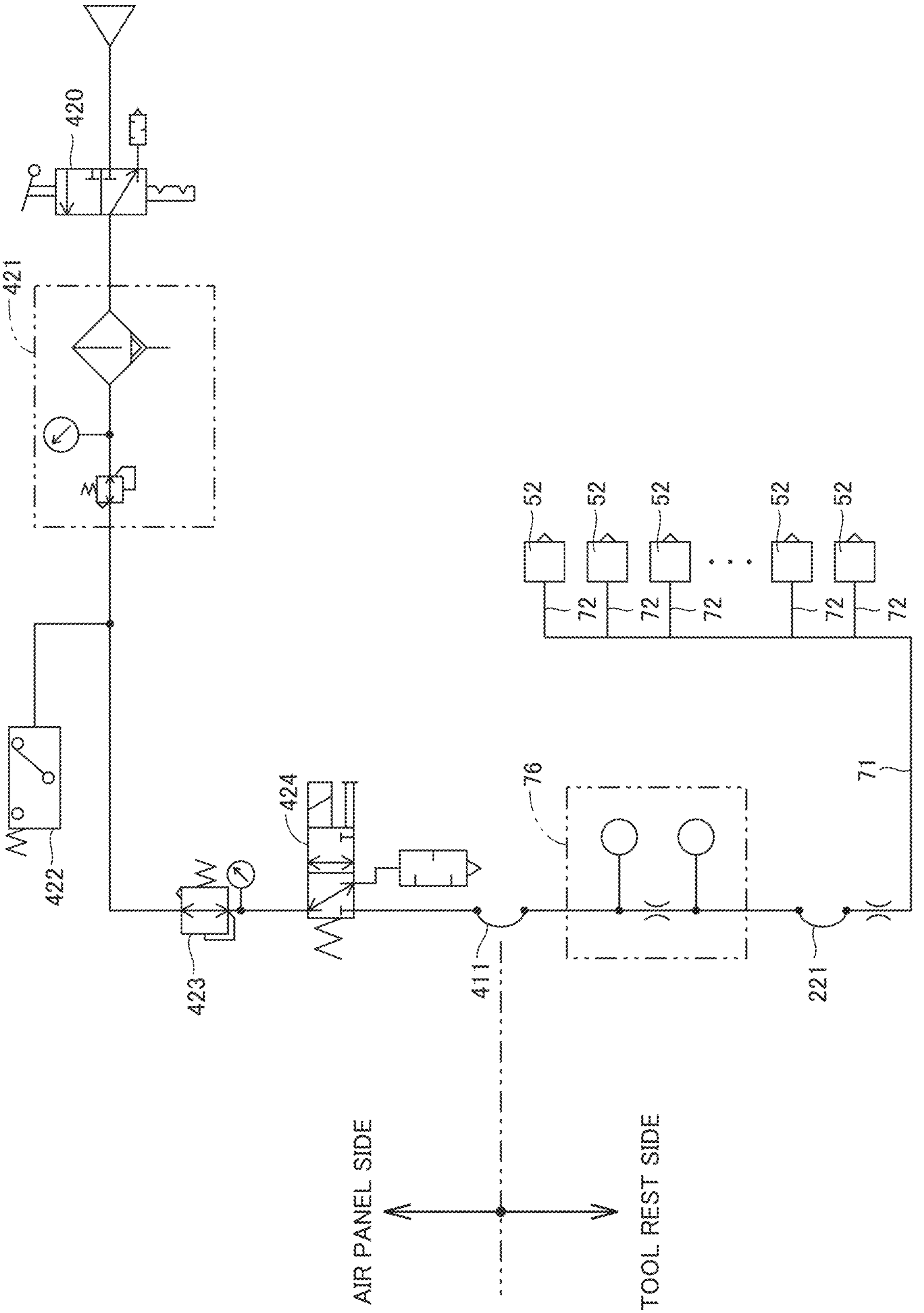
FIG. 11 shows a circuit for supplying air toward the mechanism for checking seating of the tool holder.

FIG. 11 shows a circuit for supplying air toward the mechanism for checking seating of a tool holder. Referring to FIG. 11, machine tool 100 further includes a regulator 423, an electromagnetic valve 424, and a fourth pipe 411.

Regulator 423 is provided upstream of an airflow toward the mechanism for checking seating of tool holder 61 relative to detector 76. Regulator 423 decompresses the air supplied toward the mechanism for checking seating of tool holder 61. Electromagnetic valve 424 is provided between regulator 423 and detector 76 on a path of an airflow toward the mechanism for checking seating of tool holder 61. Electromagnetic valve 424 controls an airflow toward the mechanism for checking seating of tool holder 61. Electromagnetic valve 424 opens when the power of machine tool 100 is turned on, thereby permitting an airflow toward the mechanism for checking seating of tool holder 61.

Regulator 423 and electromagnetic valve 424 are housed in an air panel provided on, for example, the rear surface of tool machine 100. The air panel further houses a safety switch 420, air preparation equipment 421 including an air filter and a regulator integrated with each other, and a pressure switch 422.

The air from the air compressor installed in a factory or the like is decompressed to a predetermined pressure (e.g., 0.5 MPa) by the regulator in air preparation equipment 421. The air is further decompressed (e.g., 0.2 to 0.3 MPa) by regulator 423 and is supplied to detector 76.

Referring to FIGS. 2, 5, and 11, detector 76 is supported by tool rest base 58. More specifically, tool rest base 58 is equipped with a terminal box, and detector 76 is housed in the terminal box. Detector 76 is provided in the space outside tool rest 50. Detector 76 is provided outside tool rest 50. Turning portion 63 is located on the rotating side on which turning portion 63 is turnable about turning center axis 101, whereas detector 76 is located on the fixing side.

Fourth pipe 411 extends between electromagnetic valve 424 and detector 76. First pipe 221 extends between detector 76 and housing 65. Fourth pipe 411 constitutes first air channel 71 together with first pipe 221, hole 222, hole 223, and first annular groove 224 in FIG. 5. First air channel 71 extends across inside and outside of tool rest 50.

Although the embodiment of the present invention has been described, it should be understood that the embodiment disclosed herein has been presented for the purpose of illustration and non-restrictive in every respect. It is therefore intended that the scope of the present invention is defined by claims, not only by the description above, and encompasses all modifications and variations equivalent in meaning and scope to the claims.

What is claimed is:

1. A tool rest comprising:

a base portion including a plurality of attachment portions; and a plurality of tool holders for clamping a plurality of tools, each of the plurality of tool holders including a clamp mechanism for clamping a corresponding one of the plurality of tools and detachably attached to a corresponding one of the plurality of attachment portions, each of the plurality of attachment portions including a seat surface on which a corresponding one of the plurality of tool holders is seated, the tool rest further comprising:

a first air channel to which air is supplied;

a plurality of second air channels branched off from the first air channel and respectively extending toward the plurality of attachment portions, each of the plurality of second air channels being open to the seat surface of a corresponding one of the plurality of attachment portions; and a detector that is provided on a path of the first air channel and detects a state of an airflow.

2. The tool rest according to claim 1, wherein the clamp mechanism is operated by a hydraulic pressure, and the tool rest further comprises a plurality of oil channels respectively extending toward the plurality of attachment portions and allowing a hydraulic oil for the clamp mechanism to flow therethrough, each of the plurality of oil channels being open to the seat surface of a corresponding one of the plurality of attachment portions.

3. A machine tool comprising:

the tool rest according to claim 2; and a controller that regulates an operation of the clamp mechanism when determining, based on the state of the airflow detected by the detector, that at least one of the plurality of tool holders is not attached to a corresponding one of the plurality of attachment portions.

4. The tool rest according to claim 1, wherein the base portion further includes a turning portion that has a shape of a cylinder centered on a turning center axis and is provided with the plurality of attachment portions located side by side in a circumferential direction of the turning center axis, the turning portion being turnable about the turning center axis, a motor arranged inside the turning portion for rotating each of the plurality of tools held in a corresponding one of the plurality of tool holders, and a lid portion connected to an end of the turning portion in an axial direction of the turning center axis and being turnable about the turning center axis together with the turning portion, and the lid portion has a plurality of holes extending in a radial manner around the turning center axis and respectively forming the plurality of second air channels.

5. The tool rest according to claim 4, further comprising a shaft portion having a shape of a shaft centered on the turning center axis, wherein the lid portion is fitted onto an outer circumference of the shaft portion and turns about the turning center axis while sliding relative to the shaft portion, and an annular groove is provided between the shaft portion and the lid portion radially of the turning center axis, the annular groove extending in the circumferential direction of the turning center axis and forming the first air channel.

6. The tool rest according to claim 1, wherein the base portion further includes a turning portion provided with the plurality of attachment portions located side by side in a circumferential direction of a turning center axis, the turning portion being turnable about the turning center axis, the tool rest further comprising:

a piping block provided at a position apart from the turning center axis radially outward of the turning center axis, the position being a predetermined angular position in the circumferential direction of the turning center axis, the piping block facing the turning portion while being spaced from the turning portion axially of the turning center axis; and a piston mechanism that is built in the piping block and advances and retreats axially of the turning center axis to be distant from the turning portion during turning of the turning portion and be connected to the turning portion during stop of the turning portion, the piston mechanism forming a channel for a fluid.

7. The tool rest according to claim 1, wherein the detector is provided outside the tool rest.

8. The tool rest according to claim 1, wherein the first air channel extends across inside and outside of the tool rest.

* * * * *